United States Patent
Hayakawa et al.

(10) Patent No.: US 9,061,364 B2
(45) Date of Patent: Jun. 23, 2015

(54) TIG WELDING METHOD AND APPARATUS

(75) Inventors: Tsuyoshi Hayakawa, Hekinan (JP); Hideaki Shirai, Anjo (JP)

(73) Assignee: DENSO CORPORATION, Kariya (JP)

(*) Notice: Subject to any disclaimer, the term of this patent is extended or adjusted under 35 U.S.C. 154(b) by 724 days.

(21) Appl. No.: 13/366,822

(22) Filed: Feb. 6, 2012

(65) Prior Publication Data
US 2012/0199561 A1    Aug. 9, 2012

(30) Foreign Application Priority Data

Feb. 9, 2011    (JP) .................. 2011-026217

(51) Int. Cl.
| B23K 9/24 | (2006.01) |
| B23K 9/08 | (2006.01) |
| B23K 9/167 | (2006.01) |

(52) U.S. Cl.
CPC .. B23K 9/08 (2013.01); B23K 9/167 (2013.01)

(58) Field of Classification Search
CPC ....................................................... B23K 9/08
USPC .................. 219/75, 60 R, 61, 122, 123, 136
See application file for complete search history.

(56) References Cited

U.S. PATENT DOCUMENTS

| 5,831,364 A * | 11/1998 | Buse .................. 310/156.28 |
| 2002/0063485 A1* | 5/2002 | Lee et al. .............. 310/154.15 |
| 2003/0106671 A1 | 6/2003 | Cho et al. |
| 2003/0159809 A1 | 8/2003 | Valenzuela |

FOREIGN PATENT DOCUMENTS

| GB | 2 038 686 A | 7/1980 |
| GB | 2 038 687 A | 7/1980 |
| JP | A-54-152643 | 12/1979 |
| JP | A-01-095876 | 4/1989 |
| JP | A-1-95877 | 4/1989 |
| JP | A-4-37478 | 2/1992 |
| JP | A-5-84571 | 4/1993 |
| JP | A-5-146875 | 6/1993 |
| JP | A-7-32146 | 2/1995 |

(Continued)

OTHER PUBLICATIONS

Japanese Office Action issued in Japanese Application No. 2011-026217 dated Jan. 29, 2013 (w/translation).

(Continued)

*Primary Examiner* — Jianying Atkisson
(74) *Attorney, Agent, or Firm* — Oliff PLC

(57) ABSTRACT

A TIG welding method and apparatus which enable a higher aspect ratio weld zone cross-sectional shape to be obtained and which further can prevent the heat radiated from the weld arc causing the permanent magnets to overheat, specifically a TIG welding method which causes an arc discharge between a workpiece and an electrode of a welding torch to cause the generation of a weld arc, uses permanent magnets to generate a magnetic field around the weld arc, and causes an electromagnetic force which is generated by electromagnetic interaction between the magnetic field and a current to act on a weld pool of the workpiece in welding, the TIG welding method arranging the permanent magnets around the electrode of the welding torch and moving the permanent magnets to make the magnetic field fluctuate and thereby make the drive force of convection which is applied to the weld pool fluctuate.

2 Claims, 4 Drawing Sheets

(56) References Cited

FOREIGN PATENT DOCUMENTS

| JP | A-7-195176 | 8/1995 |
| JP | A-8-338207 | 12/1996 |
| JP | A-9-66365 | 3/1997 |
| JP | A-9-186279 | 7/1997 |
| JP | A-9-239537 | 9/1997 |
| JP | A-2003-42670 | 2/2003 |
| JP | A-2005-518518 | 6/2005 |
| JP | A-2005-211919 | 8/2005 |
| JP | A-2007-95762 | 4/2007 |
| JP | A-2008-105056 | 5/2008 |
| JP | A-2008-153423 | 7/2008 |
| JP | A-2008-267743 | 11/2008 |

OTHER PUBLICATIONS

Dec. 2, 2013 Chinese Office Action issued in Chinese Application No. 201210028365.6 (with translation).

* cited by examiner

CROSS-SECTION AA (a)

(b)

TIG WELDING METHOD AND APPARATUS

BACKGROUND OF THE INVENTION

1. Field of the Invention

The present invention relates to a TIG welding method and apparatus. More specifically, it relates to a TIG welding method and apparatus which cause an arc discharge between a workpiece and an electrode of a welding torch to cause the generation of a weld arc, use permanent magnets to cause the generation of a magnetic field around the weld arc, and make electromagnetic force which is generated due to electromagnetic interaction of the magnetic field and current act on a weld pool of the workpiece in welding.

2. Description of the Related Art

As a TIG welding method and apparatus which cause an arc discharge between a workpiece and an electrode of a welding torch to cause the generation of a weld arc, use permanent magnets to cause the generation of a magnetic field around the weld arc, and make electromagnetic force which is generated due to electromagnetic interaction of the magnetic field and current act on a weld pool of the workpiece in welding, there are the method etc. which are described in Japanese Patent Publication (A) No. 2008-105056.

See Japanese Patent Publication (A) No. 2008-105056 for the related art.

However, when using the welding method of Japanese Patent Publication (A) No. 2008-105056, it is not possible to obtain a higher aspect ratio weld zone cross-sectional shape. The "aspect ratio" means the ratio of the melt depth H and average melt width W. Further, as shown in Example 2 of Japanese Patent Publication (A) No. 2008-105056 (FIG. 2), when arranging permanent magnets around the electrode of a welding torch, there is the inconvenience that sometimes the heat radiated from the weld arc causes the permanent magnets to overheat.

SUMMARY OF THE INVENTION

The present invention was made in consideration of the above situation and has as its object to provide a TIG welding method and apparatus which enable a higher aspect ratio weld zone cross-sectional shape to be obtained and which further can prevent the heat radiated from the weld arc from causing the permanent magnets to overheat.

According to a first aspect of the present invention, there is provided a TIG welding method which causes an arc discharge between a workpiece (5) and an electrode of a welding torch (3) to cause the generation of a weld arc (8), uses permanent magnets (7) to generate a magnetic field around the weld arc (8), and causes an electromagnetic force which is generated by electromagnetic interaction between the magnetic field and a current to act on a weld pool (17) of the workpiece (5) in welding, the TIG welding method arranging the permanent magnets (7) around the electrode (4) of the welding torch (3) and moving the permanent magnets (7) to make the magnetic field fluctuate and thereby make the Lorentz force which is applied to the weld pool fluctuate in welding.

By arranging the permanent magnets around the electrode of the welding torch and moving the permanent magnets to make the magnetic field fluctuate, electromotive force is generated and an eddy current is formed. Due to the formation of this eddy current, the Lorentz force of the weld pool increases and a force which drives inward convection increases. Due to such action, a higher aspect ratio weld zone cross-sectional shape can be obtained. Further, due to the movement of the permanent magnets, heat conduction is accelerated between the surrounding air and the permanent magnets and therefore heat radiated from the weld arc can be prevented from causing the permanent magnets to overheat.

According to a second aspect of the present invention, the TIG welding method makes the permanent magnets (7) move back and forth cyclically in an axial direction of the electrode (4) of the welding torch (3) to thereby cause the magnetic field to fluctuate. This shows one mode of motion of the permanent magnets.

According to a third aspect of the present invention, there is provided a TIG welding apparatus which causes an arc discharge between a workpiece (5) and an electrode (4) of a welding torch (3) to cause the generation of a weld arc (8) and melts and joins the workplace (5) by the weld arc (8), which TIG welding apparatus (100) is provided with the electrode (4) of the welding torch (3), permanent magnets (7) which are arranged around the electrode (4) of the welding torch (3), and permanent magnet moving means (11 to 15) for making the permanent magnets (7) move with respect to the electrode (4) of the welding torch (3).

By arranging the permanent magnets around the electrode of the welding torch and moving the permanent magnets to make the magnetic field fluctuate, electromotive force is generated and an eddy current is formed. Due to the formation of this eddy current, the Lorentz force of the weld pool increases and a force which drives inward convection increases. Due to such action, a higher aspect ratio weld zone cross-sectional shape can be obtained. Further, due to the movement of the permanent magnets, heat conduction is accelerated between the surrounding air and the permanent magnets and therefore heat radiated from the weld arc can be prevented from causing the permanent magnets to overheat.

According to a fourth aspect of the present invention, the TIG welding apparatus makes the permanent magnets (7) move back and forth cyclically in an axial direction of the electrode (4) of the welding torch (3) to thereby cause the magnetic field to fluctuate. This shows one mode of motion of the permanent magnets.

BRIEF DESCRIPTION OF THE DRAWINGS

These and other objects and features of the present invention will become clearer from the following description of the preferred embodiments given with reference to the attached drawings, wherein:

FIG. 5A shows the air pressure which is applied to the permanent magnets from the upper side, while FIG. 5B shows the air pressure which is applied to the permanent magnets from the lower side;

DESCRIPTION OF THE PREFERRED EMBODIMENTS

First Embodiment

Figure 1:
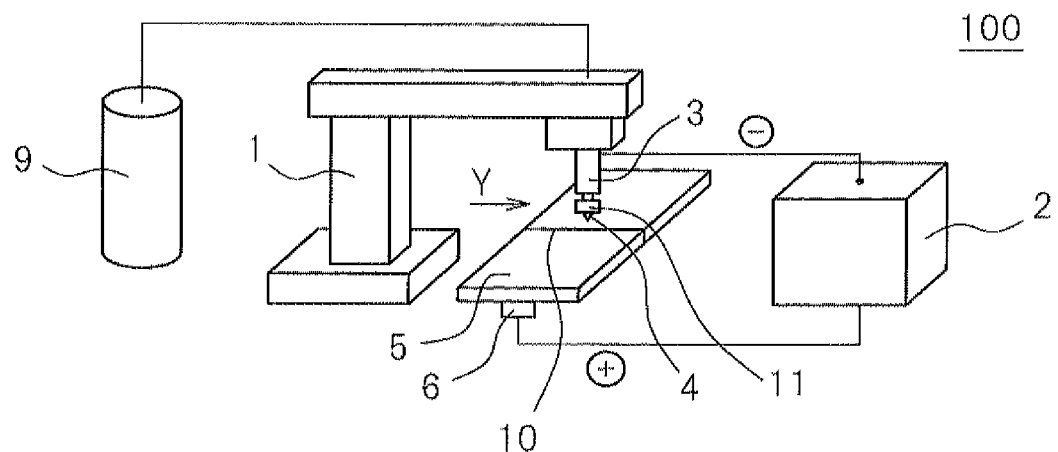
FIG. 1 is a schematic view of a TIG welding apparatus according to the present invention.

FIG. 1 is a schematic view of a TIG welding apparatus 100 of the present invention which is provided with permanent magnets 7 which cause the generation of a magnetic field between an electrode 4 and a workpiece 5. As shown in FIG. 1, the TIG welding apparatus 100 is provided with an electrode 4 of a welding torch 3 which is arranged at a welding machine body 1 and to which a negative electrode of a TIG welding power supply 2 is connected and an electrode 6 which is connected to a workpiece 5 and which acts as a positive electrode. Inert gas is supplied from a shielding gas container 9 to an outer circumference 16 of the electrode 4 (see FIG. 2). Further, not shown inert gas is ejected from between the later explained magnet housing 11 and electrode 4, covers the surface of the weld arc 8, and prevents the weld zone from oxidizing. Further, the center axis of the electrode 4 of the welding torch 3 and the welded part 10 of the workpiece 5 (weld line) 10 are made to match. Further, during performance of welding, the workpiece 5 is made to move in the Y-direction (weld line direction) by, for example, a 10 mm/s speed. Due to this, the weld line 10 is formed with a weld bead.

Figure 2:
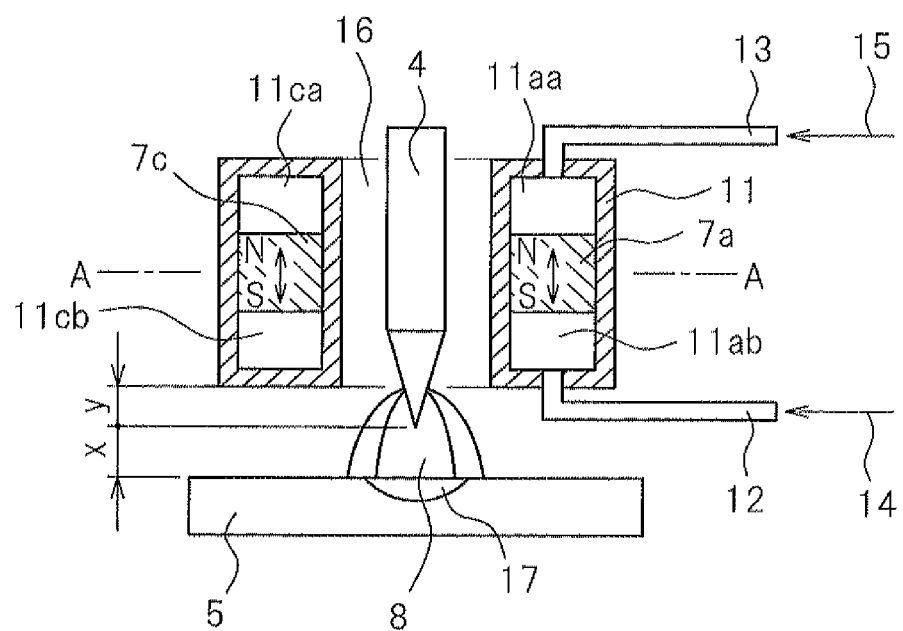
FIG. 2 is a schematic view of the weld arc generation part of FIG. 1.
Figure 3:
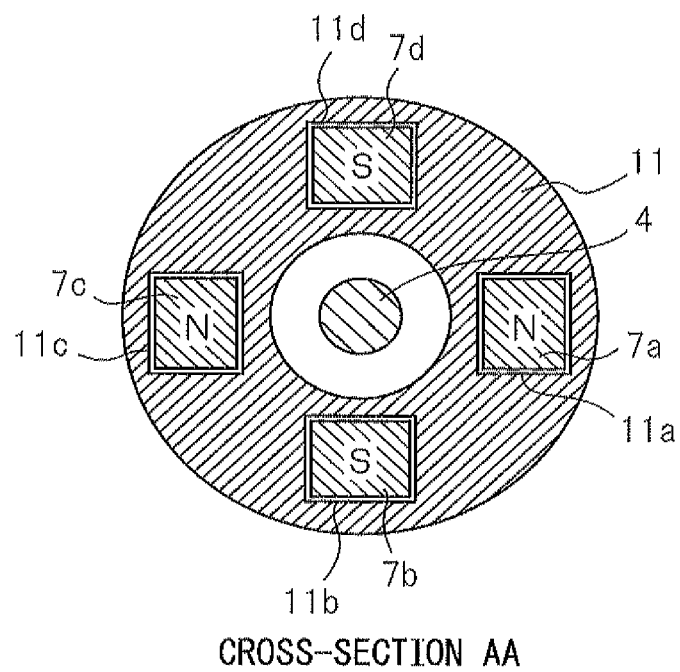
FIG. 3 is a cross-sectional view along the line A-A of the weld arc generation part of FIG. 2.

FIG. 2 is a schematic view of the weld arc generation part of FIG. 1, while FIG. 3 shows a cross-section along the line A-A of the weld arc generation part of FIG. 2. A distance x between a tip of the electrode 4 and the workpiece 5 is, for example, 1 mm, while a distance y between a bottom end face of the later explained magnet housing 11 and the tip of the electrode 4 is, for example, 0.5 mm. As shown in FIG. 2, permanent magnets 7 are arranged at positions away from the center axis of the electrode 4 by exactly predetermined distances so as to influence the weld arc 8 which is generated between the electrode 4 and the workpiece 5.

The permanent magnets 7, as shown in FIG. 2 and FIG. 3, are columnar (block shaped) magnets with rectangular cross-sections. In the first embodiment, four permanent magnets 7 are arranged in the magnetic housing 11 at positions at equal intervals around the electrode 4 and at equal distances from the center axis of the electrode 4. Further, the magnetic poles (S magnetic poles and N magnetic poles) of the permanent magnets 7 are located at the two end faces of the columns. As shown in FIG. 3, in a plane view, the four permanent magnets 7 are arranged with the same magnetic poles facing each other. Further, next to each permanent magnet 7, another permanent magnet 7 having an opposite magnetic pole to the magnetic pole of that permanent magnet 7 is arranged. Note that, making the magnetic lines of force of a magnetic field pass through the weld arc 8 in a large amount is important in obtaining the desired effect. Therefore, for the permanent magnets 7, rare earth magnets with large magnetic flux densities are employed. Due to this, a compact, powerful magnetic field is obtained.

The TIG welding method is a method of joining parts of a workpiece 5 by melting them by the weld arc 8. The weld arc 8 is an arc discharge which flows between the electrode 4 and the welded part 10 conductive with the electrode 6 and is comprised of a flow of charged particles in a high temperature plasma state. The arc discharge basically occurs in the space of the shortest distance between the electrode 4 and the welded part 10, is formed on the center axis of the electrode 4, and has a bell shape. The arc discharge itself is a flow of charged particles in a plasma state, that is, due to the flow of current, a magnetic field is generated around the arc discharge by this current, that is, arc current (separate from magnetic field which is caused by permanent magnets 7).

Figure 4:
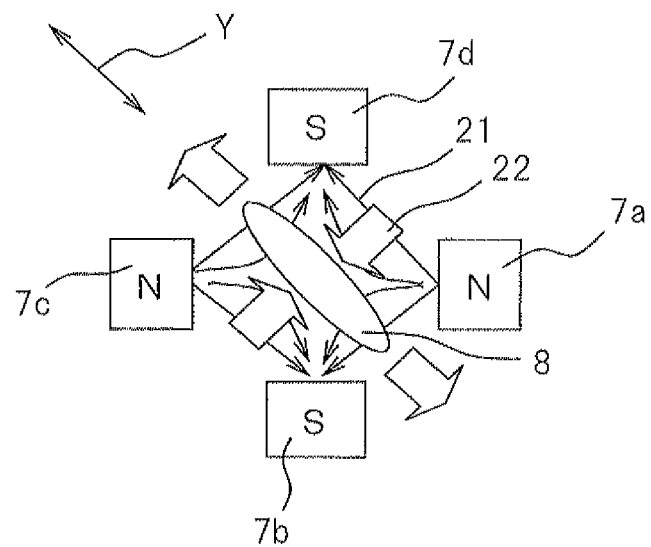
FIG. 4 is a view of the state of deformation of the weld arc due to the permanent magnets.

The magnetic field which is generated by the permanent magnets acts on the weld pool. In the same way as the weld arc, the weld pool is also run through by a current resulting in the generation of magnetic force, so a Lorentz force acts. This is one of the forces driving convection at the weld pool and is called an "electromagnetic force". When viewed from the cross-section of the weld pool, it is a force which acts inward from the outside. If it becomes larger, a deep melted shape can be obtained. The method of amplifying this melting action is to move the magnets. That is, by moving the magnets, an electromotive force is generated and an eddy current is formed. In addition to the magnetic lines of force due to the permanent magnets, due to the formation of the eddy current, the Lorentz force increases compared with the case of not moving the magnets. Due to this, the inward convection increases at the weld pool and a higher aspect ratio weld pool cross-sectional shape can be obtained. Note that, due to the arrangement of the permanent magnets 7 which are shown in FIG. 3, as shown in FIG. 4, a magnetic field is generated and magnetic lines of force 21 arise among the permanent magnets 7a, 7b, 7c, and 7d. Further, the weld arc 8 is deflected by the Lorentz force which is produced due to the electromagnetic interaction between the magnetic field and the arc current (generated between the electrode 4 and the workpiece 5). The deflection direction of the weld arc 8 is made to match the weld line direction Y. Due to this, the weld arc 8 can cause the generation of a large weld line direction component of the energy of the arc discharge in the deflection direction, that is, the weld line direction Y. This action assists the average melted width becoming narrower and the melting of the weld zone becoming deeper. Furthermore, together with the cyclic fluctuations in the cross-sectional shape of the weld arc 8, a higher aspect ratio weld zone cross-sectional shape can be obtained.

The magnet housing 11, as shown in FIGS. 2 and 3, is a cylindrical shape and has four holes 11a, 11b, 11c, and 11d which house the four permanent magnets 7 in a slidable manner. One permanent magnet 7a is housed inside the holding hole 11a of the magnet housing 11 in a manner able to slide up and down. The holding hole 11a is divided in space by the permanent magnet 7a and therefore has a space 11aa at an upper side of the permanent magnet 7a and a space 11ab at the lower side. The holding holes 11b, 11c, and 11d have similar structures as the holding hole 11a. Further, the upper spaces 11aa, 11ba, 11ca, and 11da of the four permanent magnets 7 are connected by a predetermined passage (not shown), while the lower spaces 11ab, 11bb, 11cb, and 11db as well are connected by a separate passage (not shown). Further, the bottom end of each lower space, for example, 11ab, is connected to an air passage 12, while the top end of each upper space, for example, 11aa, is connected to an air passage 13. Due to this structure, the four permanent magnets 7a, 7b, 7c, and 7d can move synchronously up and down.

Figure 5:
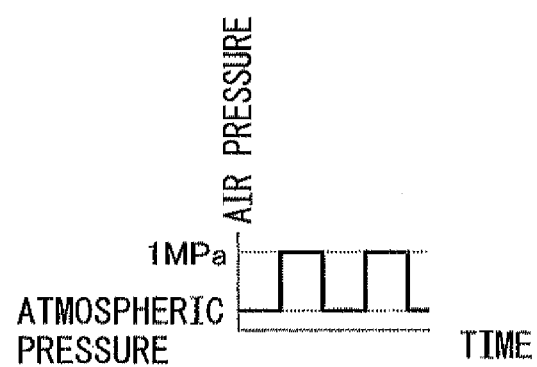
Figure 5:
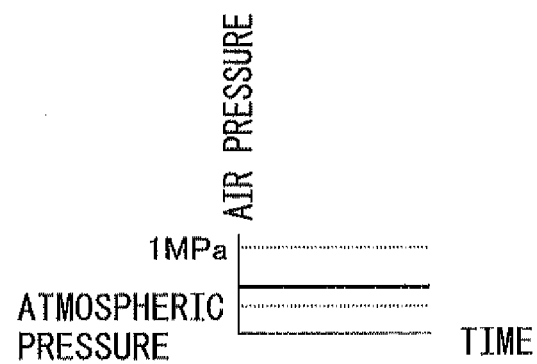

The air passage 13 is supplied with pulsed air pressure 15 which cyclically fluctuates between atmosphere pressure and 1 MPa such as shown in FIG. 5(a) by an air pressure control means (not shown), while the air passage 12 is supplied with constant air pressure 14 which is higher than atmospheric pressure and lower than 1 MPa such as shown in FIG. 5(b). The period of the pulsed air pressure is, for example, 15 Hz. Due to this pulsed air pressure, one permanent magnet 7a cyclically moves back and forth in the axial direction of the electrode 4 of the welding torch 3. Further, since the four holes 11a, 11b, 11c, and 11d of the magnet housing 11 are structured in this way, the other permanent magnets 7b, 7c, and 7d also move synchronously with the movement of the permanent magnets 7a. Note that, the distance over which the permanent magnets 7 move back and forth is, for example, 0.5 mm.

Due to this cyclic back and forth motion of the permanent magnets 7, an electromotive force is generated and an eddy current is formed at the weld pool 17. Due to the formation of this eddy current, the Lorentz force at the weld pool increases and the force which drives inward convection increases. Furthermore, the plasma formed by the arc discharge which is applied to the weld zone cyclically fluctuates, an unsteady heat flow occurs at the weld zone, a good weld zone with sufficient deep melting is obtained, and a higher aspect ratio weld zone cross-sectional shape can be obtained. Furthermore, due to movement of the permanent magnets, heat conduction is accelerated between the surrounding air and permanent magnets and the heat radiated from the weld arc can be prevented from causing the permanent magnets to overheat.

Figure 6:
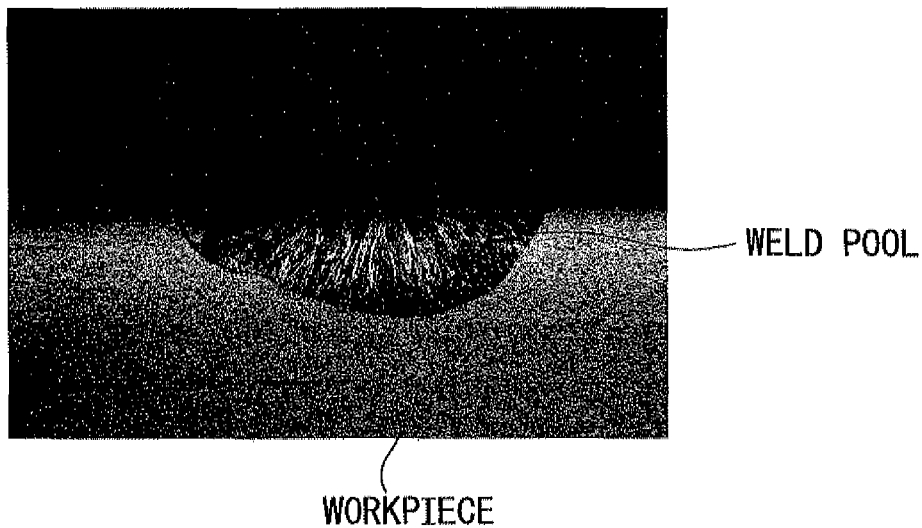
FIG. 6 is a photograph of a weld zone cross-section according to a welding method according to the present invention.
Figure 7:
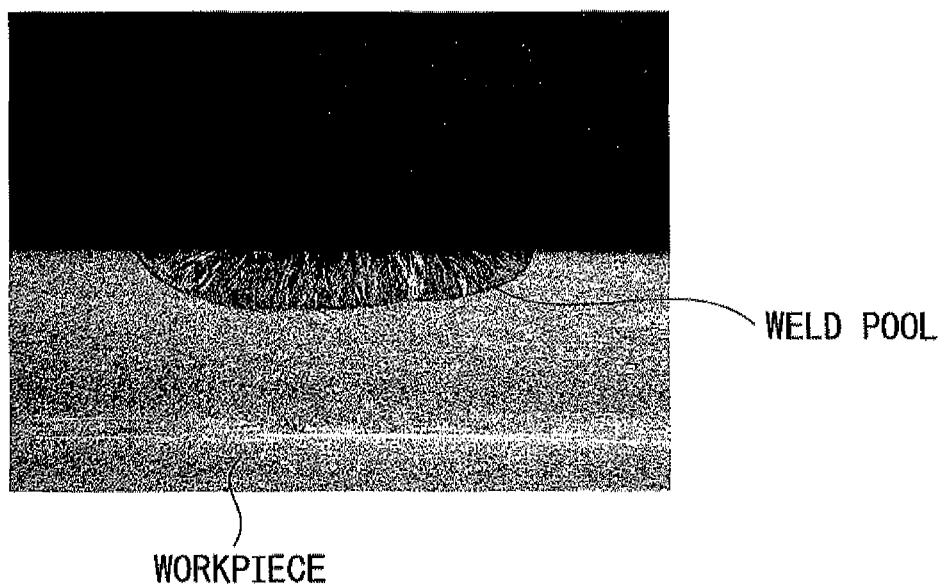
FIG. 7 is a photograph of a weld zone cross-section according to a conventional TIG welding method.

FIG. 6 shows a photograph of a weld zone cross-section according to the welding method according to the present invention, while FIG. 7 is a photograph of a weld zone cross-section according to a conventional (fixed permanent magnet type) TIG welding method. It will be understood that the weld zone cross-section according to the welding method according to the present invention clearly becomes deeper in weld pool than the conventional method.

Other Embodiments

In the first embodiment, the cyclic back and forth motion of the permanent magnets 7 was performed by air pressure control, but instead of air pressure control, for example, cam drive using a motor may also be used to cause the cyclic back and forth motion. That is, the fact that to achieve cyclic back and forth motion of the permanent magnets 7, any means of pneumatic, hydraulic, or mechanical drive etc. may be used would be obvious to a person skilled in the art. Further, in the first embodiment, cyclic back and forth motion of the permanent magnets 7 was used, but instead of cyclic motion, random (irregular) back and forth motion is also possible. Further, instead of back and forth motion, for example, the magnet housing 11 may be made to rotate about the electrode 4 so as to cause the permanent magnets to rotate (orbit). Further, in the first embodiment, the four permanent magnets 7 were arranged regularly at equal intervals, but they may also be arranged irregularly.

While the invention has been described with reference to specific embodiments chosen for purpose of illustration, it should be apparent that numerous modifications could be made thereto by those skilled in the art without departing from the basic concept and scope of the invention.

The invention claimed is:

1. A TIG welding method that (i) causes an arc discharge between a workpiece and an electrode of a welding torch to generate a weld arc, (ii) uses permanent magnets to generate a magnetic field around the weld arc, and (iii) an electromagnetic force that is generated by electromagnetic interaction between the magnetic field and a current to act on a weld pool of the workpiece in welding, the method comprising the steps of:
arranging the permanent magnets around the electrode of the welding torch by way of a motion actuator that includes a magnet housing having holes that house the permanent magnets so that the permanent magnets are able to slide up and down in an axial direction of the welding torch, each of the holes having an upper space on the upper side of the permanent magnet therein that is connected to a first air passage and a lower space on the lower side of the permanent magnet therein that is connected to a second air passage; and
supplying (i) the second air passage with pulsed air that cyclically fluctuates between atmospheric pressure and 1 MPa and (ii) the first air passage with constant air pressure that is higher than atmospheric pressure and lower than 1 MPa so as to cause the permanent magnets to cyclically slide up and down, thereby making the magnetic field fluctuate and making the Lorentz force applied to the weld pool fluctuate in welding.

2. A TIG welding apparatus configured to cause an arc discharge between a workpiece and an electrode of a welding torch to generate a weld arc and to melt and join the workpiece by way of the weld arc, the TIG welding apparatus comprising:
the electrode of the welding torch;
permanent magnets that are arranged around the electrode of the welding torch; and
a motion actuator that includes a magnet housing having holes that house the permanent magnets so that the permanent magnets are able to slide up and down in an axial direction of the welding torch, each of the holes having an upper space on the upper side of the permanent magnet therein that is connected to a first air passage and a lower space on the lower side of the permanent magnet therein that is connected to a second air passage,
wherein the motion actuator is configured to cause (i) the second air passage to be supplied with pulsed air that cyclically fluctuates between atmospheric pressure and 1 MPa and (ii) the first air passage to be supplied with constant air pressure that is higher than atmospheric pressure and lower than 1 MPa so as to cause the permanent magnets to cyclically slide up and down, thereby making a magnetic field around the weld arc generated by the permanent magnets fluctuate.

* * * * *